United States Patent
Unoson et al.

(10) Patent No.: US 9,913,351 B2
(45) Date of Patent: Mar. 6, 2018

(54) LIGHTING CONTROL SYSTEM

(71) Applicant: Fagerhults Belysning AB, Habo (SE)

(72) Inventors: Daniel Unoson, Habo (SE); Mats Wernberg, Stockholm (SE)

(73) Assignee: FAGERHULTS BELYSNING AB, Habo (SE)

( * ) Notice: Subject to any disclaimer, the term of this patent is extended or adjusted under 35 U.S.C. 154(b) by 0 days.

(21) Appl. No.: 15/129,315

(22) PCT Filed: Mar. 27, 2014

(86) PCT No.: PCT/EP2014/056192
§ 371 (c)(1),
(2) Date: Sep. 26, 2016

(87) PCT Pub. No.: WO2015/144231
PCT Pub. Date: Oct. 1, 2015

(65) Prior Publication Data
US 2017/0118825 A1    Apr. 27, 2017

(51) Int. Cl.
*H05B 37/02* (2006.01)
*H04L 12/28* (2006.01)
(Continued)

(52) U.S. Cl.
CPC ....... *H05B 37/0272* (2013.01); *H04L 12/281* (2013.01); *H04L 12/282* (2013.01);
(Continued)

(58) Field of Classification Search
None
See application file for complete search history.

(56) References Cited

U.S. PATENT DOCUMENTS 8,013,545 B2 * 9/2011 Jonsson .................. F21V 23/04
                                                315/297
8,033,686 B2 * 10/2011 Recker ............... H05B 33/0803
                                                362/249.02
(Continued)

FOREIGN PATENT DOCUMENTS

EP    1841149 A2    10/2007
EP    2020788 A2     2/2009
(Continued)

OTHER PUBLICATIONS

International Search Report and Written Opinion from International Application No. PCT/EP2014/056192, dated Jan. 12, 2014 (10 pages).

*Primary Examiner* — Vibol Tan
(74) *Attorney, Agent, or Firm* — Kagan Binder, PLLC

(57) ABSTRACT

The present invention relates to a lighting control system (1) comprising a first sub-system (10) having a first control unit (12), a gateway module (14) in communication (24) with the first control unit, and at least one first lighting unit (16) associated with the first control unit, and a second sub-system (40) having a second control unit (42) and at least one second lighting unit (46) associated with the second control unit. The first control unit comprises a first communication module (121) for wireless communication (26) in a first personal area network with the at least one associated first lighting unit (16), and a second communication module (122) for wireless communication (30) in a second personal area network with the second control unit (42).

20 Claims, 2 Drawing Sheets

(51) Int. Cl.
*H04W 4/00* (2018.01)
*H04L 29/08* (2006.01)
*H05B 33/08* (2006.01)

(52) U.S. Cl.
CPC ........ *H04L 12/2809* (2013.01); *H04L 67/125* (2013.01); *H04W 4/008* (2013.01); *H05B 33/0842* (2013.01); *H05B 37/0227* (2013.01); *H05B 37/0245* (2013.01); *H04L 2012/285* (2013.01); *H04L 2012/2841* (2013.01)

(56) References Cited

U.S. PATENT DOCUMENTS

| | | | |
|---|---|---|---|
| 8,452,554 B2* | 5/2013 | Jonsson | G01D 4/002 |
| | | | 702/60 |
| 8,519,566 B2* | 8/2013 | Recker | H02J 9/065 |
| | | | 307/64 |
| 8,742,686 B2* | 6/2014 | Zampini, II et al. | H05B 33/0857 |
| | | | 257/13 |
| 8,994,276 B2* | 3/2015 | Recker | H02J 9/02 |
| | | | 315/160 |
| 9,357,621 B2* | 5/2016 | Lim | H05B 37/02 |
| 9,432,209 B2* | 8/2016 | Wendt | H04L 12/282 |
| 9,635,744 B2* | 4/2017 | Xu | H05B 37/0272 |
| 2011/0127916 A1 | 6/2011 | Kim | |
| 2012/0025957 A1 | 2/2012 | Yang | |
| 2012/0062360 A1* | 3/2012 | Wendt | H04L 12/2809 |
| | | | 340/5.8 |
| 2014/0300293 A1* | 10/2014 | Ruan et al. | H05B 33/0842 |
| | | | 315/294 |
| 2015/0048760 A1* | 2/2015 | Kwag et al. | H05B 37/0272 |
| | | | 315/297 |
| 2016/0036484 A1* | 2/2016 | Sullivan et al. | H04B 1/40 |
| | | | 315/291 |

FOREIGN PATENT DOCUMENTS

| | | |
|---|---|---|
| GB | 2459280 A | 10/2009 |
| WO | 2012/090116 A1 | 7/2012 |
| WO | 2013/034350 A1 | 3/2013 |
| WO | 2013/034362 A1 | 3/2013 |

* cited by examiner

LIGHTING CONTROL SYSTEM

CROSS-REFERENCE TO RELATED APPLICATIONS

This application claims priority to and the benefit of International Application No. PCT/EP2014/056192, filed Mar. 27, 2014, and titled "LIGHTING CONTROL SYSTEM", which is incorporated herein by reference in its entirety.

TECHNICAL FIELD

The present disclosure relates to a system for control of lighting units, and especially a system comprising sub-systems of lighting units.

BACKGROUND OF THE INVENTION

A room, such as an office, may comprise a plurality of light sources. It could be one or more desktop lights, ambient lights, wall spotlights, window lights etc. All light sources in the room together form room lighting optimal for a user in a certain situation. The light sources may be connected to a common network such that each light source may be controlled. A controlling device may control settings of each light source based on predetermined conditions. Such conditions may be the presence of a user, the identity of a user or time of the day. Information from the light sources may further be gathered through the network for statistical and analyzing purposes.

Such system may be a sub-system limited to one room such that settings of each room do not unintentionally affect light sources in another room.

However, in a large office, there will be a large number of rooms with similar setups, i.e. each room comprising a lighting sub-system. To manage the sub-systems in all rooms, each sub-system is connected to a local wireless network (WLAN) through a gateway. The gateway in each sub-system is configured for communication with the respective controlling device. A manager of a system comprising a plurality of such sub-systems may thereby communicate with each sub-system through the WLAN and the respective gateway.

A drawback with such system is that it requires a large amount of work to configure each gateway to communicate with the WLAN. This makes the installation of the sub-systems in all rooms and the system in general expensive.

Consequently, there is a need for a more cost-effective lighting control system for a plurality of rooms.

SUMMARY OF THE INVENTION

It is an object of the present invention to provide an improved solution that alleviates the mentioned drawbacks with present devices. Furthermore, it is an object to provide a lighting control system for at least two separate sub-systems.

This is provided according to an aspect of the present invention wherein a lighting control system comprises a first sub-system comprising a first control unit, a gateway module in communication with the first control unit, and at least one first lighting unit associated with the first control unit, and a second sub-system comprising a second control unit and at least one second lighting unit associated with the second control unit. The first control unit comprises a first communication module for wireless communication in a first personal area network with the at least one associated first lighting unit, and a second communication module for wireless communication in a second personal area network with the second control unit.

By providing the first sub-system with a gateway module, a connection to a local area network, wired or wireless, may be provided. The gateway module may be configured for such connection to provide communication between the local area network and the first sub-system. In the first sub-system, the first control unit may communicate, via the first communication module, with the associated first lighting units. The communication with the first lighting units may be one-way or two-way communication. The first lighting units may comprise light-emitting luminaires and/or light-responsive sensors such as a motion sensor. Further, the first control unit may communicate, via the second communication module, with other sub-systems in the lighting control system. Such other sub-systems may be a lighting sub-system in a room as the second sub-system. The lighting control system may comprise a plurality of sub-systems, each being a lighting sub-system in a room. The second lighting units in the second sub-system may communicate with the second control unit similar as the first lighting units communicate with the first control unit. The communication between the second lighting units and the second control unit may be one-way or two-way communication. The second lighting units may comprise light-emitting luminaires and/or light-responsive sensors such as a motion sensor.

By providing the first control unit with two communication modules, the first sub-system may communicate with the second sub-system. The second sub-system may thereby communicate with the local area network via the first control unit and the gateway module. Hence, there is no need for a separate gateway module in the second sub-system. If the lighting control system comprises further sub-system, only one gateway module, in the first sub-system, may still be needed, hence further strengthen the advantage of the communication in such lighting control system.

The wording lighting unit indicates a device provided with illumination means such as light emitting diode(s), light bulb(s) or equivalent, for providing light.

In one embodiment, the first communication module and the second communication module are arranged on a single dual-PAN chip.

In one embodiment, the communication in the first personal area network may be in a ZigBee protocol. Hence, the first communication module may be configured for communication with the associated first lighting unit(s) according to a ZigBee protocol. The communication in the first personal area network may then be low-powered and secure. In a further embodiment, the first communication module may be a ZigBee module configured for communication with a ZigBee module in an associated first lighting unit. Correspondingly, the second control unit may comprise a first communication module for communication with an associated second lighting unit, and a second communication module for communication with the first control unit in the second personal area network. The communication modules in the second control unit may be ZigBee modules. The second lighting unit may comprise a ZigBee module for communication with the first communication module of the second control unit.

In a further embodiment, the second personal area network may be a wireless mesh network, and the first control unit and the second control unit may be mesh nodes. The lighting control system may comprise additional sub-system, e.g. a third sub-system, a fourth sub-system and so on. Each n:th sub-system may then communicate with the n:th−1 sub-system, which communicates with the n:th−2 sub-system and so on until the first sub-system is reached which distributes the communication to the gateway module. Hence, each n:th control unit may only need to be able to communicate with the n:th+1 and the n:th−1 control units. For example, the second control unit may communicate with the first control unit and a further (third) control unit in a further (third) sub-system. A short-range communication of low power may then be enough to form the mesh network. In one embodiment, the short-range communication between the control units, i.e. the communication in the second personal area network, may be in a ZigBee protocol. Regardless with which sub-system a communication to the local area network is provided, the communication may be distributed through each first to n:th control unit to the gateway module in the first sub-system. An effective way of connecting a plurality of sub-systems with a local area network via a gateway module may then be provided.

In one embodiment, the second control unit may be configured to send information about the second sub-system to the first control unit, and the first control unit may distribute the information to the gateway module. Such information may be information of power consumption of the lighting units in the second sub-system, or information from a sensor in the second sub-system. The gateway module and the control units in the system may be configured for both sending information from the gateway module to each of the control units, and for receiving information from each of the control units to the gateway module. The first control unit may be configured correspondingly to send information about the first sub-system to the gateway module. All such communication may be distributed via the first control unit and each control unit following the first control unit until the present control unit is reached.

The communication between the first control unit and the gateway module may in one embodiment be wireless. The gateway module may then be located anywhere in range of the first control unit. The gateway module may be in communication with the second communication module in the first control unit and hence in connection with the second personal area network. The communication between the gateway module and the first control unit may be in a ZigBee protocol. The gateway module may be a mesh node in a mesh network with the first control unit and the second control unit.

In one embodiment, the first control unit may be configured for communication with a mobile device. Such communication may provide that the first lighting unit is controllable via the mobile device. The first control unit may further be configured to provide information from the first sub-system to the mobile device. In one embodiment, the communication between the first control unit and the mobile device may be Bluetooth communication. The first control unit may be configured for communication in a Bluetooth protocol with the mobile device. The communication between the first control unit and a mobile device may thereby be easily setup and configured, and may be possible with a large range of mobile devices. The first control unit may comprise a Bluetooth communication module for the communication with a mobile device. Similarly, the second control unit may be configured for Bluetooth communication with a mobile device for control of the second lighting units. The communication with the mobile device may further provide information to the mobile device regarding the second lighting units. The second control unit may comprise a Bluetooth module for the communication with the mobile device. A mobile device may be prevented from being connected to more than one control unit at the time.

The wording "mobile device" in the context of this application shall be understood as any electrical device being mobile and having the capability of wireless communication. This includes, but is not limited to, smart phones, tablets, laptop computers, notebooks or similar.

In a further embodiment, the lighting control system may further comprise a plurality of additional sub-systems, wherein each of the additional sub-systems may comprise a control unit, and wherein all control units in the lighting control system together may form a wireless mesh network. Each of the control units of the plurality of additional sub-systems may, similar as the first and second control units, comprise a first communication module for internal communication with lighting units in the sub-system, and a second communication module for wireless communication with the previous and the subsequent control unit in the mesh network. Each second communication module in the control units may be a ZigBee module.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The invention will in the following be described in more detail with reference to the enclosed drawings, wherein.

DETAILED DESCRIPTION

Figure 1:
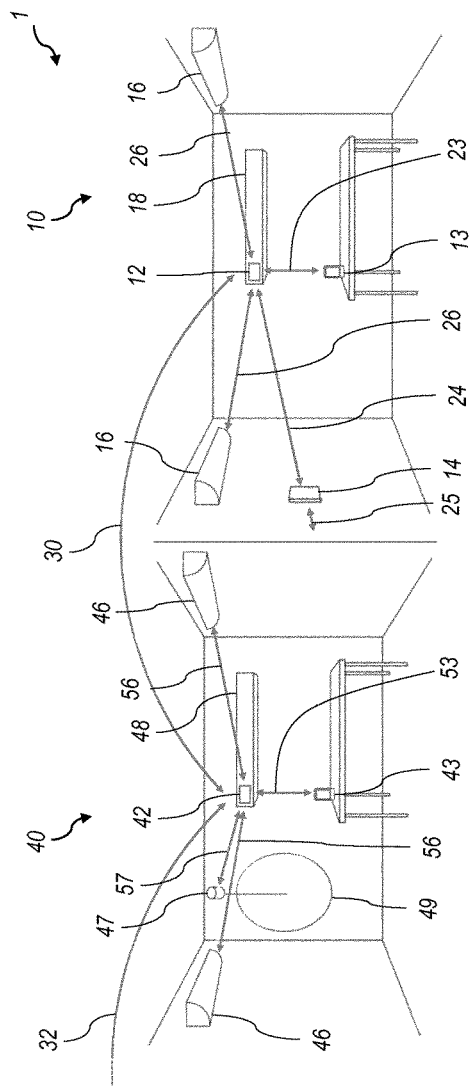
FIG. 1 shows a perspective view of a lighting control system according to an embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1 illustrates an embodiment of the present invention wherein a lighting control system 1 comprises a first sub-system 10 and a second sub-system 40. The first sub-system 10 comprises a first control unit 12 and at least one first lighting unit 16. In the illustrated embodiment there are two first lighting units 16. The first lighting units 16 are wirelessly connected to the first control unit 12 in a first personal area network. The first control unit 12 is configured to control the first lighting units 16 via communication 26 in the first personal area network. The first control unit 12 comprises a first communication module 121 (see FIG. 3) configured for wireless communication 26 in the first personal area network.

In the illustrated embodiment, the first control unit 12 is arranged in a lighting fixture 18. The lighting fixture 18 is controlled by the first control unit 12. The lighting fixture 18 may be connected to the first control unit 12 via communication in the first personal area network. Alternatively, the lighting fixture 18 may be connected by wire to the first control unit 12.

The first control unit 12 can send operation signals to the lighting units 16 in the first sub-system 10. Such operation signals may control the illumination level, light output color and/or color temperature of the lighting unit 16. In one embodiment, the lighting units 16 may send information back to the first control unit 12. Such information may regard e.g. power consumption of the lighting unit 16.

The communication 26 in the first personal area network follows a ZigBee protocol. The first communication module 121 in the first control unit 12 is then a ZigBee module. To communicate with the first communication module 121 in the first control unit 12, each lighting unit 16 comprises a ZigBee module (not shown).

The first control unit 12 is configured for wireless communication 24 with a gateway module 14. The gateway module 14 enables further communication 25 with a wire or wireless local area network. A manager of the lighting control system 1 may then connect to the sub-systems therein 10, 40 through the gateway module 14. The manager may for instance use a computer connected to the local area network to access the gateway module 14. The communication 24 between the first control unit 12 and the gateway module 14 follows a ZigBee protocol.

Figure 2:
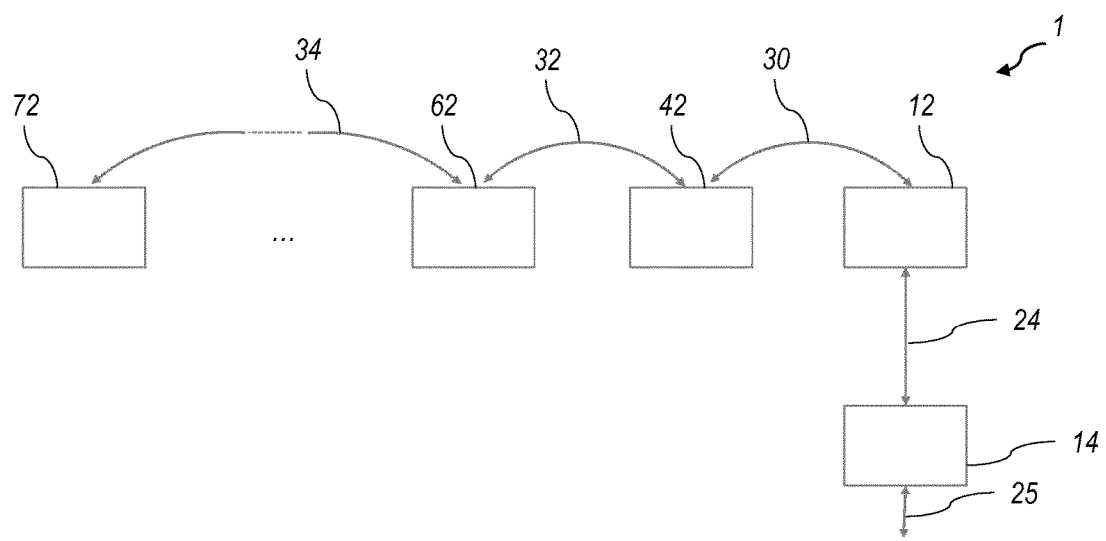
FIG. 2 shows a schematic scheme of a lighting control system according to an embodiment of the present invention.
Figure 3:
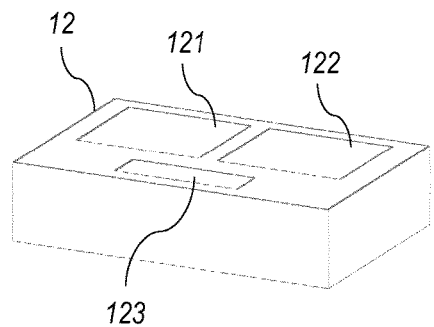
FIG. 3 shows a perspective view of a first control unit according to an embodiment of the present invention.

The first control unit 12 further comprises a second communication module 122 (see FIG. 3). The second communication module 122 is configured to communicate 30 with a second control unit 42 in the second sub-system, in a second personal area network. The second control unit 42 comprises a corresponding second communication module 422 (see FIG. 4) for communication with the first control unit 12. The second communication module 422 in the second control unit 42 is further configured for communication 32 with an additional control unit 62 (see FIG. 2) in an additional sub-system.

As seen in FIG. 2, the communication 30, 32, 34 between the control units 12, 42, 62, 72 in a lighting control system according to an embodiment of the invention is configured in a mesh network. Hence, each control unit 42, 62, 72 communicates with the two control units on the respective side in the chain of control units, i.e. the respective previous and subsequent control unit. The first control unit 12 communicates with the gateway module 14, which may be a mesh node in the mesh network. Communication between the gateway module 14 and each of the control units 12, 42, 62, 72 has a route via each control unit downstream from the target control unit towards the gateway module 14. For example, when information is sent from the gateway module 14 to the control unit 62, the information is distributed via the first control unit 12 and the second control unit 42 to reach the control unit 62. Such information may regard desired lighting conditions in the sub-system (room) controlled by that control unit 62. Further, information may be sent from the control unit 62 to the gateway module 14. The information will then be distributed via the second control unit 42 and the first control unit 12 to reach the gateway module 14. Such information may regard power consumption of lighting units in the sub-system controlled by that control unit 62. A manager of the lighting control system 1 may gather power consumption information regarding all lighting units in all sub-systems by being connected to the single gateway module 14.

As further seen in FIG. 1, the second sub-system 40 comprises, similar to the first sub-system 10, lighting units 46 in communication 56 in a first personal area network with the second control unit 42. The second control unit 42 comprises a first communication module 421 (see FIG. 4) for communication in the first personal area network 56. The first communication module 421 is a ZigBee module. Each lighting unit 46 comprises a ZigBee module for communication with the second control unit 42.

In the illustrated embodiment, the second control unit 42 is arranged in a lighting fixture 48. The lighting fixture 48 is controlled by the second control unit 42 similar to the lighting units 46. The lighting fixture 48 may be in communication 46 with the second control unit 42 via the first personal area network. Alternatively, the lighting fixture 48 may be connected by wire to the second control unit 42.

The illustrated embodiment further comprises a sensor unit 47 in the second sub-system 40. The sensor unit 47 communicates 57 with the second control unit 42 in the first personal area network of the second sub-system, i.e. with the first communication module 421 of the second control unit 42. The sensor unit 47 may be a presence sensor, temperature sensor, photo sensor or infrared sensor. The sensor unit 47 provides information to the second control unit 42 which the second control unit 42 distributes in the mesh network 30 to the gateway module 14. The second control unit 42 may also send control signals to the sensor unit 47, for instance based on a request from the gateway module 14.

Figure 4:
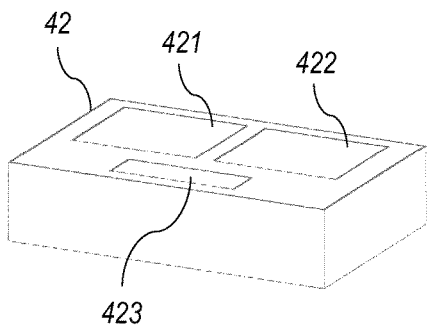
FIG. 4 shows a perspective view of a second control unit according to an embodiment of the present invention.

Each of the control units 12, 42 may comprise a Bluetooth module 123, 423 (see FIGS. 3 and 4). The Bluetooth modules 123, 423 are configured for communication 23, 53 with a mobile device 13, 43. Such mobile device 13, 43 may be any electrical device being mobile and having the capability of wireless communication. This includes, but is not limited to, smart phones, tablets, laptop computers, notebooks or similar. The communication 23, 53 with a mobile device 13, 43 in the first or second sub-system 10, 40 may be limited to information regarding the sub-system the mobile device is in communication with. The Bluetooth module 123, 423 in the respective control unit 12, 42 is optional. The Bluetooth module 123, 423 may for instance be present in control units in only one or a selection of the sub-systems present in the lighting control system.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A lighting control system (1) comprising
a first sub-system (10) comprising, a first control unit (12), a gateway module (14) in communication with the first control unit, and at least one first lighting unit (16) associated with the first control unit, and
a second sub-system (40) comprising a second control unit (42), and at least one second lighting unit (46) associated with the second control unit,
wherein the first control unit comprises a first communication module (121) for wireless communication (26) in a first personal area network with said at least one associated first lighting unit, wherein the first control unit further comprises a second communication module (122) for wireless communication (24, 30) in a second personal area network with the second control unit, and wherein the second personal area network is a wireless mesh network, and wherein the first control unit (12) and the second control unit (42) are mesh nodes.

2. The lighting control system according to claim 1, wherein the communication (26) in the first personal area network is in a ZigBee protocol.

3. The lighting control system according to claim 1, wherein the first communication module (121) is a ZigBee module, and wherein each at least one first lighting unit (16) comprises a ZigBee module for communication with the first communication module.

4. The lighting control system according to claim 1, wherein the second control unit (42) is configured for wireless communication (32) with a further subsequent sub-system forming a wireless mesh network.

5. The lighting control system according to claim 1, wherein the communication (24, 30) in the second personal area network is in a ZigBee protocol.

6. The lighting control system according to claim 1, wherein the gateway module (14) is in wireless communication with the first control unit (12).

7. The lighting control system according to claim 6, wherein the wireless communication between the gateway module (14) and the first control unit (12) is a part of the communication (24, 30) in the second personal area network.

8. The lighting control system according to claim 1, wherein the gateway module (14) is configured to receive information from the second sub-system (40) via the first and the second control units (12, 42).

9. The lighting control system according to claim 1, wherein the second control unit (42) is configured to send information about the second sub-system (40) to the first control unit (12), and wherein the first control unit distributes the information to the gateway module (14).

10. The lighting control system according to claim 9, wherein the information about the second sub-system (40) comprises information of power consumption of the at least one second lighting unit (46).

11. The lighting control system according to claim 1, wherein the first control unit (12) is configured for communication (23) with a mobile device (13), such that the first lighting unit (16) is controllable via the mobile device.

12. The lighting control system according to claim 11, wherein the first control unit (12) is configured for communication (23) in a Bluetooth protocol with the mobile device (13).

13. The lighting control system according to claim 1, wherein the lighting control system further comprises a plurality of additional sub-systems, wherein each of the additional sub-systems comprises a control unit, and wherein all control units in the lighting control system together forms a wireless mesh network.

14. The lighting control system according to claim 2, wherein the lighting control system further comprises a plurality of additional sub-systems, wherein each of the additional sub-systems comprises a control unit, and wherein all control units in the lighting control system together forms a wireless mesh network.

15. A lighting control system, comprising
a first sub-system (10) comprising, a first control unit (12), a gateway module (14) in communication with the first control unit, and at least one first lighting unit (16) associated with the first control unit, and a second sub-system (40) comprising a second control unit (42), and at least one second lighting unit (46) associated with the second control unit, wherein the first control unit comprises a first communication module (121) for wireless communication (26) in a first personal area network with said at least one associated first lighting unit, and wherein the first control unit further comprises a second communication module (122) for wireless communication (24, 30) in a second personal area network with the second control unit, wherein the lighting control system further comprises a plurality of additional sub-systems, wherein each of the additional sub-systems comprises a control unit, and wherein all control units in the lighting control system together forms a wireless mesh network.

16. The lighting control system according to claim 15, wherein the first communication module (121) is a ZigBee module, and wherein each at least one first lighting unit (16) comprises a ZigBee module for communication with the first communication module.

17. The lighting control system according to claim 15, wherein the communication (26) in the first personal area network is in a ZigBee protocol.

18. The lighting control system according to claim 15, wherein the communication (24, 30) in the second personal area network is in a ZigBee protocol.

19. A lighting control system (1), comprising
a first sub-system (10) comprising, a first control unit (12), a gateway module (14) in communication with the first control unit, and at least one first lighting unit (16) associated with the first control unit, and a second sub-system (40) comprising a second control unit (42), and at least one second lighting unit (46) associated with the second control unit, wherein the first control unit comprises a first communication module (121) for wireless communication (26) in a first personal area network with said at least one associated first lighting unit, and wherein the first control unit further comprises a second communication module (122) for wireless communication (24, 30) in a second personal area network with the second control unit, wherein the second personal area network is a wireless mesh network, and the first control unit (12) and the second control unit (42) are mesh nodes, and wherein the second control unit (42) comprises a third communication module (421) for wireless communication (56) with said at least one second lighting unit (46) associated with the second control unit, and a fourth communication module (422) for wireless communication (30, 32) in the second personal area network with the first control unit (12).

20. The lighting control system according to claim 19, wherein the third communication module (421) and the fourth communication module (422) of the second control unit (42) are ZigBee modules.

* * * * *